United States Patent
Pinschmidt et al.

(10) Patent No.: US 10,400,877 B2
(45) Date of Patent: Sep. 3, 2019

(54) DRIVE UNIT FOR A MOTOR VEHICLE, MOTOR VEHICLE, AND METHOD FOR OPERATING A MOTOR VEHICLE

(71) Applicant: AUDI AG, Ingolstadt (DE)

(72) Inventors: Udo Pinschmidt, Gaimersheim (DE); Stefanie Seide, Riedenburg (DE)

(73) Assignee: AUDI AG, Ingolstadt (DE)

( * ) Notice: Subject to any disclaimer, the term of this patent is extended or adjusted under 35 U.S.C. 154(b) by 205 days.

(21) Appl. No.: 15/519,252

(22) PCT Filed: Oct. 14, 2015

(86) PCT No.: PCT/EP2015/002028
§ 371 (c)(1),
(2) Date: Apr. 14, 2017

(87) PCT Pub. No.: WO2016/062384
PCT Pub. Date: Apr. 28, 2016

(65) Prior Publication Data
US 2017/0227105 A1 Aug. 10, 2017

(30) Foreign Application Priority Data
Oct. 24, 2014 (DE) .......... 10 2014 015 793

(51) Int. Cl.
*F16H 48/36* (2012.01)
*B60K 1/00* (2006.01)
(Continued)

(52) U.S. Cl.
CPC .............. *F16H 48/36* (2013.01); *B60K 1/00* (2013.01); *B60K 6/365* (2013.01); *B60K 6/48* (2013.01);
(Continued)

(58) Field of Classification Search
CPC ...................................................... F16H 48/36
See application file for complete search history.

(56) References Cited

U.S. PATENT DOCUMENTS

| 5,387,161 A | 2/1995 | Shibahata |
| 2012/0165148 A1 | 6/2012 | Boskovitch et al. |
| 2016/0003337 A1* | 1/2016 | Smetana ................. F16H 48/36 475/5 |

FOREIGN PATENT DOCUMENTS

| CN | 102459957 A | 5/2012 |
| CN | 103303116 A | 9/2013 |
| (Continued) | | |

OTHER PUBLICATIONS

German Office Action dated Aug. 18, 2017, in connection with corresponding DE Application No. 10 2014 015 793.8 (8 pgs.).
(Continued)

*Primary Examiner* — Derek D Knight
(74) *Attorney, Agent, or Firm* — Maier & Maier, PLLC (57) ABSTRACT

Drive device for a motor vehicle, includes a differential for distributing a torque that can be supplied via a drive shaft to two output shafts and a superimposition gear coupled with the differential one of the output shafts and an additional motor for superimposing torques supplied from the output shaft, from the differential and from the additional motor, wherein the differential is coupled via a torque reducing transmission ratio device with the superimposition gear, wherein the superimposition gear includes a switching device that can be controlled with a control device, wherein the superimposition gear superimposes in a first switching mode torques supplied to the switching device from the output shaft.

13 Claims, 4 Drawing Sheets

(51) Int. Cl.
| | |
|---|---|
| B60K 6/48 | (2007.10) |
| B60K 6/365 | (2007.10) |
| B60K 6/52 | (2007.10) |
| B60W 10/08 | (2006.01) |
| B60K 17/16 | (2006.01) |
| B60K 17/35 | (2006.01) |
| B60K 23/04 | (2006.01) |
| F16H 48/08 | (2006.01) |
| F16H 48/10 | (2012.01) |
| B60W 10/16 | (2012.01) |
| B60W 20/00 | (2016.01) |
| B60K 6/38 | (2007.10) |

(52) U.S. Cl.
CPC ............... *B60K 6/52* (2013.01); *B60K 17/16* (2013.01); *B60K 17/35* (2013.01); *B60K 23/04* (2013.01); *B60W 10/08* (2013.01); *F16H 48/08* (2013.01); *F16H 48/10* (2013.01); *B60K 2001/001* (2013.01); *B60K 2006/381* (2013.01); *B60W 10/16* (2013.01); *B60W 20/00* (2013.01); *B60W 2720/406* (2013.01); *B60Y 2200/91* (2013.01); *B60Y 2200/92* (2013.01); *B60Y 2300/80* (2013.01); *B60Y 2400/73* (2013.01); *B60Y 2400/80* (2013.01); *B60Y 2400/82* (2013.01); *F16H 2048/106* (2013.01); *F16H 2048/364* (2013.01); *Y02T 10/6221* (2013.01); *Y02T 10/6265* (2013.01); *Y10S 903/911* (2013.01); *Y10S 903/916* (2013.01)

(56) References Cited

FOREIGN PATENT DOCUMENTS

| | | |
|---|---|---|
| DE | 2005 049 707 A1 | 4/2007 |
| DE | 10 2006 031 089 A1 | 1/2008 |
| DE | 10 2009 056 366 A1 | 6/2011 |
| DE | 10 2010 036 240 A1 | 3/2012 |
| DE | 10 2013 202 381 A1 | 8/2014 |
| DE | 10 2013 202 382 A1 | 8/2014 |
| WO | 2006/010186 A1 | 2/2006 |
| WO | 2008/125364 A2 | 10/2008 |
| WO | 2014/124640 A2 | 8/2014 |
| WO | 2014/191091 A1 | 12/2014 |
| WO | 2015/185042 A1 | 12/2015 |

OTHER PUBLICATIONS

International Search Report dated Mar. 23, 2016 of corresponding application No. PCT/EP2015/002028; 15 pgs.

Translation of the International Preliminary Report on Patentability dated May 4, 2017, in connection with corresponding PCT Application No. PCT/EP2015/002028 (9 pgs.).

Office Action dated Feb. 27, 2019 in corresponding Chinese Application No. 201580057753.9; 19 pages.

\* cited by examiner

DRIVE UNIT FOR A MOTOR VEHICLE, MOTOR VEHICLE, AND METHOD FOR OPERATING A MOTOR VEHICLE

BACKGROUND

The invention relates to a drive device for a motor vehicle, comprising a differential for distributing a drive torque that can be supplied via a drive shaft to two output shafts, and a superposition gear coupled to the differential, one of the output shafts and an additional motor, in order to superimpose the torque supplied by the output shaft, wherein the differential is coupled via a torque reducing transmission device to the superposition gear.

Differentials are used in motor vehicles in order to distribute a driving torque provided by a drive motor to different wheels of an axle, or to different axles. In order to prevent twisting of wheels and to transmit yaw moments to the motor vehicle in a specific driving situation, it is advantageous to influence in a certain way the torque distribution on the output shafts of such a differential. One possibility for this is so called electronic torque vectoring, in which an additional motor is used in order to distribute the torques to the output shafts of the differential. Torque vectoring in this case describes in this case the distribution of the torque both for faster rotation and also for slower rotation of the wheel of a vehicle axle.

From publication WO 2006/010186 A1 is known an electric torque vectoring transmission in which a driving torque is distributed via two bevel differentials to two drive shafts. Superposition of an additional electromotor is carried out with two planetary gears, to achieve that the electromotor is stationary when the wheels are rotating at the same speed. The problem in this case is that due to the use of a bevel gear differential, a high transmission ratio of the electromotor as well as many transmission gear ratios are required and that the load on the planetary gears is relatively high with the described arrangement.

Another possibility for designing an electrical torque vectoring transmission is described in the publication DE 2005 049 707 A2. Parts of the superposition gear are in this case integrated in the differential of the motor vehicle. A disadvantage of the described arrangement is that the planetary gears constantly roll. In order to achieve a standstill of the electromotor at equally fast high rotational speeds of the drive shafts, an additional parallel shaft must be provided.

The publication U.S. Pat. No. 5,387,161 also discloses an electrical torque vectoring transmission. The differential is in this case formed by a spur wheel planetary gear. The transmission gear is coupled to the differential via a spur wheel stage and comprises a planetary gear. In particular, the spur wheel stage is with the described arrangement exposed to high loads, which is why a corresponding dimensioning of the components is required.

In order to reduce high loads of a superposition gear with electronic torque vectoring, publication WO 2008/125364 A proposes an additional planetary gear for torque reduction between a superposition gear and the differential. This can be designed in particular in the form of a Ravigneaux gear set together with the differential of the motor vehicle. In this case, the load on the superposition gear is approximately one fourth of the wheel differential torque, which means that the transmission is small in size and that it can be easily constructed.

It is also known that an electromotor that is used within the context of electronic torque vectoring can be also used to provide hybrid functions in a motor vehicle. For example the application DE 10 2010 036 240 proposes to couple the electromotor selectively to the differential in such a way that a drive torque provided by the electromotor is distributed to the drive shafts of the differential and thus to the wheels of the motor vehicle, or to couple the electromotor to the superposition gear in such a way that is usable for torque vectoring. The complete decoupling of the torque path for a hybrid operation on the one hand, and for a torque vectoring on the other hand, leads to a relatively complicated construction type, wherein additional planetary or spur wheel transmissions are generally required in order to achieve the desired transmission ratios in the hybrid or torque vectoring mode. In addition, the load on the components of the superposition gear is relatively heavy.

The application DE 10 2006 031 089 discloses a torque vectoring transmission wherein a gear train for the hybrid mode is constructed at least partially jointly for a torque vectoring mode. The switching between different operating modes is carried out by shifting of a shift sleeve. The design of the transmission is relatively complicated, in particular because stepped planetary gears are required. In addition, the load on the superposition gear is relatively high in the torque vectoring mode. Moreover, the transmission ratios between the electromotor and the wheel differential mode in the torque vectoring mode or in the driving torque in the hybrid mode are the same. However, different transmission ratios are typically used in different modes.

SUMMARY OF THE DISCLOSURE

The object of the invention is therefore to provide a drive device for a motor vehicle which on the one hand enables a flexible use of an additional motor that is used within the context of torque vectoring, and on the other hand also enables a lower load on a superposition gear during torque vectoring.

The object is achieved with a transmission device of the type described in the introduction, wherein the superposition gear comprises a switching device that can be controlled with a control device, wherein the superposition gear in a first switching state of the switching device superimposes the torques supplied by the output shaft, the differential and the additional motor in such a way that the distribution of the drive torque to the output shafts depends on an additional torque that is exerted by an additional motor, and in a second switching state, the switching device superimposes the torques supplied by the output shaft, the differential and the additional motor in such a way that the additional torque is distributed uniformly to both output shafts.

According to the invention, it is therefore proposed to modify a drive device with a differential and with a superposition gear that is coupled to the differential via a torque reducing device, as is known for example the application WO 2008/125364 A, wherein a controllable switching device is provided in the superposition gear. The type of the superposition of the torque supplied by the superposition gear can be switched over with the switching device provided according to the invention. Depending on the switching state of the switching device, the superposition of the torque can occur in such a way that a torque provided by the additional motor increases the torque difference between the output shafts of the differential, which is to say that a torque vectoring is caused, so that a torque of the additional motor is substantially uniformly distributed to the drive shafts, wherein driving of the output shafts or a recuperation of the movement energy is possible. The additional motor can be in particular an electromotor that can be associated with an energy storage device, wherein the functions for a hybrid operation of the motor vehicle are provided in the second switching state.

Unlike according to known drive device that enable a corresponding switching of an electromotor, the advantage of the drive device according to the invention is that a switching device is provided for switching between the use of an additional motor within a superimposition gear, to which is supplied a reduced torque from the differential with the transmission ratio device. With such a construction of the drive device, smaller rotational torques or forces occur in the superposition gear, so that the superposition gear is then small and thus it can be built easily. Since one changeover takes places between the uses of the additional motor in the superposition gear, this changeover can be also carried out with a relatively small torque.

In the second switching state, the additional torque is divided substantially equally to both output shafts. Due to component tolerances and similar factors, the additional torque that is supplied to the individual output shafts slightly deviate from each other. The distribution of the additional torque to the output shafts preferably takes place after a scaling of the additional torque by means one or several transmission ratio stages.

The transmission ratios within the drive device are advantageously selected in such a way that the additional motor has the same rotational speed at the output shafts.

The superposition gear can comprise a superposition device, which superimposes the torques supplied from the output shaft and from the additional motor with a derived torque that is derived from the torque supplied from the differential, wherein the derived torque has in the first switching state a first rotational sense, and in the second switching state it has a second rotational sense that is opposite to the first rotational sense. Switching the switching device between the first and the second switching state thus changes the rotational sense of the derived torque. In addition, the magnitude of the derived torque may differ depending on the switching state, for example when different transmission ratios are used in the first switching state, and in the second state. The switching device itself can change the rotational sense of the derive torque or control other components, in particular clutches, brakes or the like, in order to match the rotational sense of the derived torque.

The superposition gear preferably comprises a first, a second and a third planetary gear, in each case comprising a ring wheel, a sun wheel and at least one planetary wheel arranged in a planetary carrier, wherein the first planetary gear forms the superposition device, which transmits the derived torque in the first switching state via the second planetary gear, and in the second switching state through the third planetary gear. The planetary gears comprise at least three "shafts" or points for tapping the points about the central axis. Therefore, the torques can thus be coupled to the sun wheel, to the ring wheel, which in particular forms the housing of the planetary gear, and to the planetary carrier. The planetary gear can be used in a two-shaft operating mode in order to transmit torques with a predetermined transmission ratio, wherein one of the shafts is arranged in a rotationally fixed manner, or held by a clutch, a brake or the like. When all the shafts are mobile, the planetary gear operates as a superposition gear in a three-shaft mode, wherein for example a torque coupled to a shaft can be distributed to the other two shafts, or torques coupled via two shafts can be superimposed on the third shaft.

The switching device can be designed in such a way that depending on the switching state, a second or a third planetary gear can be selected, by means of which the derived torque is furnished to the first planetary gear. The shifting of the direction of the rotations between the switching states can be achieved by using different coupling of the second and of the third planetary gear for the transmission ratio and/or with the planetary gear.

It is advantageous when the first, the second and the third, or only the second and the third planetary gear are designed with the same construction, wherein a particularly efficient construction design of the drive design of the invention is possible thanks to the fact that identically designed components can be used for different functions.

The ring wheel of the first, of the second and of the third planetary gear can be designed as a common ring wheel. A fixed coupling between the three ring wheels can thus be achieved in this manner. In this case, the derived torque can be supplied from the second or from the third planetary gear to the first planetary gear via the common ring wheel.

The switching device can be designed to block in the first switching state a rotation of the ring wheel, of the sun wheel or of the planetary carriers of the second planetary gear, and in the second switching state to block a rotation of the ring wheel, of the sun wheel or of the planetary carrier of the third planetary gear. Each blocked planetary gear thus operates with two-shaft operations and can supply a torque, which is transmitted directly or indirectly with a defined direction of rotations and a defined transmission ratio for both shafts that are not blocked. It is advantageous when different types of shafts are blocked in the first and in the second switching state of the sun wheel of the second planetary gear and in the second switching state of the planetary carrier of the third planetary gear. At the same time, one shaft, namely the sun wheel, the planetary wheel or the ring wheel of the first planetary gear should be coupled both with a shaft of the second planetary gear and with a shaft of the third planetary gear. The derived torque can be supplied through this shaft to the first planetary gear. This can be done in particular with a common ring wheel of the first, the second and the third planetary gear.

One of the shafts of the second and of the third planetary transmission is blocked or can freely operate depending on the switching state. When this shaft operates freely, any relative rotations of both other shafts are possible, as a result of which no torque will be transmitted between these shafts by the respective planetary transmissions. If this shaft if blocked, the corresponding planetary gear operates as a two-shaft transmission so that a defined coupling will take place with a predetermined transmission ratio and a predetermined relative rotational direction between the torques on the other two shafts.

If only the third shaft of the second and of the third planetary gear, which is neither a shaft that is rigidly coupled to the first planetary gear, nor is it a shaft that can be blocked or that operates freely, supplies the torque from the differential via the transmission ratio device, then the supplied torque will be transmitted via the second or the third planetary gear to the first planetary gear, depending on at which planetary gear the shaft was blocked. With a corresponding arrangement of the shafts, for example when one sun wheel is blocked in a first switching state and blocking of a planetary carrier occurs in a second switching state, the rotational direction of the derived torque is changed between the switching states due to the different torque transmission path.

It is advantageous when the switching device comprises a first braking device for braking the ring wheel, the sun wheel or the planetary carrier of the second planetary gear, and a second braking device for braking the ring wheel, the sun wheel or the planetary carrier of the third planetary gear, wherein the braking device is active in the first switching state, and in the first switching state is active the second braking device. In particular, a lamella brake can be used as a blocking device. By braking the corresponding shaft, blocking can be achieved in a particularly simple manner and with low noise development. Alternatively or additionally to braking of the respective shafts, a form-locking or a force-locking coupling can be used, for example with claw coupling.

In an alternative embodiment, the ring wheel, the sun wheel or the planetary carrier of the second planetary gear, and the ring wheel, the sun wheel or the planetary carrier of the third planetary gear are permanently blocked, wherein the switching device comprises a coupling device that supplies to the superposition gear the torque supplied from the differential in the first switching state to the second planetary gear, and in the second switching state to the third planetary gear. In this case, the second and the third planetary gears always operate in a two-shaft mode, wherein the planetary gears, to which the torque is supplied via the torque-reducing transmission ratio device from the differential, so that it is transmitted with a fixed transmission ratio and with a predetermined relative rotation speed to the first planetary gear. Each planetary gear to which this torque is supplied is provided with a freely operating shaft, so that it operates without a load. The coupling device can be used for a form-fitting coupling or for a force-locked coupling. In particular, claw coupling is used.

For the first and/or the second planetary gear can be used a planetary gear having two planetary wheel sets. In such a planetary great, the sun wheel can be coupled via two planetary wheel sets, which are in particular arranged at different distances from a central axis of the planetary gear on a common planetary carrier. Such planetary gears enable bigger differences between the diameter of the ring wheel and the diameter of the sun wheel. A selection of a corresponding planetary gear as the first and/or a second planetary gear enables greater differences for matching the relative transmission ratios in the first and in the second switching state.

The differential can be designed as a double planetary gear with a first and a second planetary wheel set and with a first and a second sun wheel, wherein a ring wheel that can be driven with the drive torque via the first sun wheel and the first and the second planetary wheel set is coupled with one of the output shafts and through the second planetary wheel set and the second sun wheel as a torque-reducing transmission ratio element with the superposition gear. The double planetary gear can be in particular designed as a Ravigneaux set. Because a second sun wheel is provided, another opportunity to engage torque is provided so that a reduced torque can be tapped. The design of the transmission ratio device is thus provided while using at the same time components of the differential, wherein a generally simple design of the drive device according to the invention is possible.

As an alternative, the differential can be designed as a bevel wheel differential, wherein for a torque-reducing transmission ratio device is used another planetary gear that superimposes a torque supplied from the housing of the bevel differential with a torque superimposed by one of the output shafts to furnish the torque provided for the superposition gear. In this case, different arrangements of the respective torques or of the possibility to tap the torque on the shafts of the other planetary gears are possible.

In addition to the drive device according to the invention, the invention relates to a motor vehicle comprising a drive device according to the invention, and to a drive motor for providing the output torque. The drive motor can be a combustion engine motor and the additional motor can be an electromotor.

In addition, the motor vehicle can comprise a drive device that controls the switching device. This device can be designed to enable charging of an energy storage device that is associated with the additional motor which can be operated for recuperation, in particular with braking of the motor vehicle, wherein the switching device is operating in the second switching state and the additional motor is operation as a generator. In other operating states of the motor, the operations can be conducted in particular as a function the speed, of a yaw moment and of a steering angle of the vehicle by switching between torque vectoring, so that the switching device is operating in a first switching state, and the driving of the motor vehicle is carried out with the additional motor or with the support of the drive by the additional motor, wherein the switching device is operated each time in the second switching state.

In addition, the invention relates to a method for operating a motor vehicle with a drive motor and a drive device for driving the wheels of at least one axle of the motor vehicle, wherein the drive device is provided with a differential, by means of which a drive torque is supplied via a drive shaft from a drive motor so that the torque is distributed to two output shafts, further comprising a superposition gear coupled with the differential, and the output axles and an additional motor, through which the torque supplied from the output axle and from the differential and the additional motor is superimposed, and wherein the differential is provided with a moment-reducing transmission ratio device coupled with a superposition gear, wherein the superposition gear comprises a switching device, which is controlled with a control device, wherein the superposition gear comprises a switching device that is controlled by a control device, wherein superposition is applied with the superposition gear in a first switching state of the switching device, so that the torques supplied from the output axis, the differential and the additional motor are superimposed in such a way that the distribution of the drive torque depends on the additional torque exerted on the output shafts from an additional torque produced by an additional motor; and in a second switching state of the switching device, the torques supplied from the output axles to the differential and to the additional machine are superimposed so that the additional torque is distributed evenly to both output shafts.

The switching device can be in this case operated in at least one operating mode in which operations are conducted in the second switching mode, wherein the additional motor is controlled by a control device to provide a torque for driving of the motor vehicle. At the same time, it is possible to drive the motor vehicle only with the torque that is provided by the additional motor. However, it is also possible to support the drive torque of the drive motor, which is to say to provide a "boost" function in order to improve the driving performance. In this case, the additional motor can be used to drive only the rear wheels of the vehicle, and the front wheels can be driven by the drive motor. Alternatively, however, it is also possible to superimpose drive torques of the additional motor and of the drive motor onto the rear axle.

For an additional motor can be used an electromotor that is provided with an associated energy storage device, wherein the operations are performed in at least one operating mode of the control device by the switching device in the second switching state, wherein the additional motor is operated as a generator for charging the energy storage device. A recuperation operation can thus be conducted with the additional motor.

As was already discussed, it is possible to use during an operation of the switching device in the first switching state the additional motor for distributing the torques to the output shafts, which is to say to use it for torque vectoring.

Accordingly, the method according to the invention can be further developed in accordance with the features of the output device according to the invention with the advantages mentioned above. In particular, it is possible that a superposition gear can be used that comprises a first, a second and a third planetary gear, which is provided for the functions of the drive device mentioned above. An adaptation of the derived torque supplied to the first planetary gear is in particular possible so that with the derived torque supplied to the first planetary gear, the rotation of the ring wheel, of the sun wheel or of the planetary carrier of the second planetary transmission is blocked by the switching device in the first switching state, and the rotation of the ring wheel, of the sun wheel or of the planetary carrier of the third planetary transmission is blocked in the second switching state. The blocking can be in each case carried out in particular so that the respective ring wheel, sun wheel or the respective planetary carrier is blocked by a brake device.

As an alternative, as was already mentioned in connection with the drive device, a coupling device can be used by means of which the torque supplied to the superposition gear from the differential is supplied in the first switching state to the first planetary gear via the second planetary gear, and in the second switching state it is supplied via the third planetary gear.

BRIEF DESCRIPTION OF THE DRAWING

Further advantages and details of the invention will become apparent from the embodiments described below and from the attached figures, which schematically show the following.

DETAILED DESCRIPTION OF THE DRAWING

Figure 1:
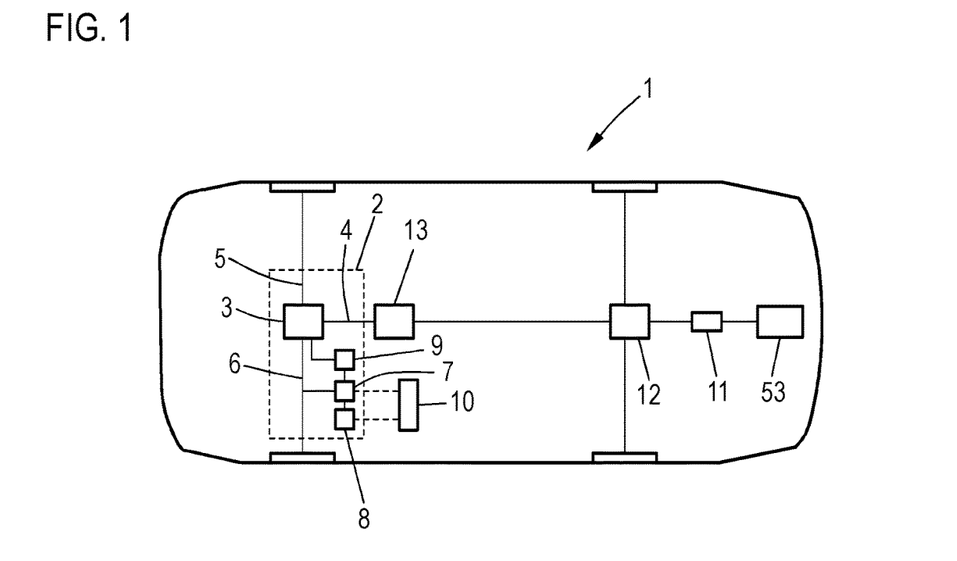
FIG. 1 an embodiment of a motor vehicle according to the invention.

FIG. 1 shows a motor vehicle 1 that comprises a drive device 2, designed to distribute the torque that can be provided from a drive motor 53 of the motor vehicle 1 via a drive shaft 4 to drive shafts 5, 6. In order to influence the distribution of the drive torque to the drive shafts 5, 6 and to provide hybrid functions for the motor vehicle, the drive device 2 comprises in addition a superposition gear 7, by means of which the torques that were supplied to the superposition gear 7 from the output shaft 6, from the differential 3 and from an additional motor 8 are superimposed. The supplying of the torques from the differential 3 is carried out via a moment reducing transmission ratio device 9, which reduces the torque that was tapped at the differential in order to reduce the loads on the superposition gear 7.

The superposition gear 7 comprises a switching device, not shown in the figure, which influences the manner in which the torque supplied by the superposition gear will be superimposed and which can be controlled with the control device 10. In a first operating mode, the torques supplied by the output shaft 6, by the differential 3 via the transmission ratio device 9, and by the additional motor 9 are superimposed in such a way that the distribution of the torques supplied via the drive shaft 4 to the drive shafts 5, 6 are dependent on an additional torque generated by the additional motor 8. The drive device 2 thus serves as a torque vectoring device, which distributes the torques of the drive motor to the wheels. The additional motor 8 can be controlled with the control device 10 in order to influence the torque distribution.

In a second switching mode of the switching device, the superposition of the supplied torque takes place in such a way that the additional torque that has been supplied by the additional motor 8 is distributed, within the context of what is possible given the tolerances of the structural components, uniformly to the both output shafts 5, 6.

The additional motor 8 of the motor vehicle 1 is an electromotor provided with an associated energy storage device, not shown in the figure. By controlling the additional motor 8 with the control device 10 in order to provide an additional torque, the output shafts 5, 6 in the motor vehicle 1 can be driven exclusively with the additional torque, or by a combination of torques provided by the drive motor 53 and additional torques. The additional torques supplied by the addition motor 8 are within the scope of the furnishing of the additional torque to the output shafts 5, 6 modified several times by means of a transmission ratio so that the torques obtained on the output shafts 5, 6 display a proportionality to the additional torque supplied by the additional motor 8, which is dependent on the transmission ratio factor.

The additional torques can be also provided by the additional motor 8 in such a way that they counteract the rotational movement of the output shafts 5, 6. The output shafts 5, 6 will thus be braked. In particular, the additional motor 8 can be operated by the control device 10 as a generator, so that a recuperation of the motive power of the motor vehicle 1 is enabled and the energy storage device, not shown can be charged.

The motor vehicle 1 is a motor vehicle provided with a four-wheel drive that can be switched on and off. A torque or an output provided from the motor 53 is first supplied via a gear 11 and then distributed by means of one or several differentials 12 between the front wheels, or between the front axle and the rear axle. The differential 3 of the drive device 2 can be separated with a clutch 13 from the drive shaft 2 guided by the front differential 12 to the drive device 2. This is particularly advantageous when the rear wheels of the vehicle 1 are to be operated only electrically by the additional motor 8, or when only recuperation of motive power should be carried out on the rear axle. The driving operation of the motor vehicle 1 can be conducted in particular in such a way that the drive device 2 will be under certain circumstances decoupled by the clutch 13 from the drive motor 53, so that the motor vehicle is then operating exclusively by a front-wheel drive. In addition, an additional drive can be provided in the second switching state of the switching device by the additional motor 8 in order to increase the driving performance of the motor vehicle 1, or the energy can be recuperated with the additional motor 8 in the second switching state.

Figure 2:
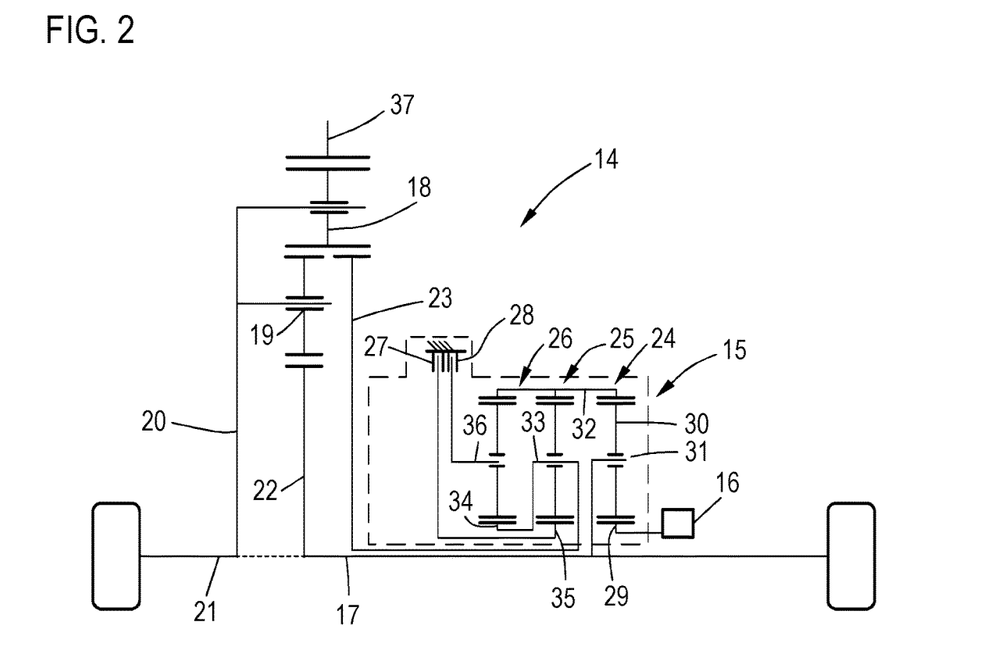
FIG. 2 an embodiment of a drive device according to the invention.

FIG. 2 shows an embodiment of a drive device 14, which comprises a superposition gear 15 by means of which torques provided from a differential via a transmission ratio device are superimposed by torques from a drive shaft 17 of the differential and by torques from an additional motor 16. For the sake of clarity, only those parts that are located above the output shaft 17 are shown in FIGS. 2 to 8 among the components of the respective drive devices 14, 39, 46, 54 which are rotationally symmetrical with respect to the output shaft 17. The illustration is not to scale. The additional motor 16 is arranged coaxially about the drive shaft 17. Alternatively, an additional motor 16 can be provided, which is arranged adjacently to the output shaft 17 and coupled to a gear wheel or the like arranged coaxially to the output shaft 17. The differential is designed as a double planetary gear, to which can be supplied a drive torque through a ring wheel 37 from one of the drive motors, not shown. The torques supplied via the ring wheel 37 are distributed by means of a first and a second planetary wheel set, from which one planetary wheel 18, 19 is shown and a first sun wheel 22, to the output shaft 17, and by means of a common planetary carrier 20 of the two planetary wheel sets to the other output shaft 21.

The superposition gear 15 is coupled via a torque-reducing device, in particular by a second sun wheel 23 of the double planetary gear, with the differential, in order to provide torques from the differential to the superposition gear. The double planetary gear with its both planetary wheel sets as well as the first sun wheel 22 and the second sun wheel 23 are designed as a Ravigneaux set, wherein a particularly compact construction of the differential and of the moment-reducing superposition device is achieved.

The superposition gear 15 comprises a first, a second and a third planetary gear 24, 25, 26, as well as a first and a second braking device 27, 28, by means of which one shaft of the second and of the third planetary gear 25, 26 can be braked. The first and the second braking device 27, 28 form together the switching device, wherein in the first switching state is active the first braking device 27, which is to say that the corresponding shaft is braked, and in the second switching state is active the braking device 28. The first and the second braking device 27, 28 can be controlled by a control device, not shown, so as to select the switching state of the switching device.

The first planetary gear 24 forms a superposition device, which superimposes the torque derived from the torque supplied from the differential by a torque of the output shaft 17 and a torque of the additional motor 16. For this purpose, the additional motor 16 drives the sun wheel of the first planetary gear 24 and the planetary carrier 31 is rigidly coupled to the drive shaft 17. The supplying of the derived torque occurs via the ring gear, which is designed as a common ring gear for the first, the second and the third planetary gear 24, 15, 26. Depending on the switching state of the switching device, this derived torque is supplied to the first planetary gear 24 via the second planetary gear 25 or the third planetary gear 26.

The torque that is decoupled from the differential via the second sun gear 23 is coupled into the superposition gear 15 on the one hand through the planetary carrier 33 of the second planetary carrier 33 of the second planetary gear 25, and on the other hand through the sun wheel 34 of the third planetary gear 26. If the switching device is in the first switching state, the sun wheel 35 of the second planetary gear 25 is braked or blocked by the first braking device 27, wherein the second planetary gear 25 is operating with two-axle operations so that a torque that is coupled via the planetary carrier 33 is transmitted with a predetermined transmission ratio and a predetermined rotational direction to the common ring wheel 32. Since the second braking device 28 is not active in the first switching state, the planetary carrier 36 of the second planetary gear 26 is essentially freely rotatable, so that the sun wheel 34 is also essentially freely rotatable without force acting against the common ring wheel 32.

In the first switching state is thus transmitted a torque from the second sun wheel 23 via the second planetary gear 25 to the second planetary gear 24.

In the second switching state, the first braking device 27 is not active and the second braking device 28 is active. Accordingly, the planetary carrier 36 of the third planetary gear 26 is braked, so that the third planetary gear 26 transfers through a common ring wheel 33 the torque supplied via the sun wheel 33 to the first planetary gear 24 with a predetermined transmission ratio and a predetermined relative direction of rotation. Due to the different guidance of the torque from the second sun wheel 23 to the common ring wheel 32 in the two switching states, the derived torque that acts on the common ring wheel 32 differs between the two switching states both in terms of magnitude and in terms of the plus/minus sign. The rotational sense of the torque acting on the common ring wheel 32 is therefore different between the first and the second switching state.

As will be explained in the following with reference to FIGS. 3 to 5, the different rotational sense of the derived torque leads to different effects on the common ring wheel 32 in the switching states, which results in different modes of operation of an additional torque provided by the additional motor 16. In the first switching state, which is to say when the second sun wheel 23 is coupled via the second planetary gear 25 to the first planetary gear 24, the application of an additional torque by means of the additional motor 16 leads to influencing the distribution of a torque input in the differential to the ring wheel 37, so that the torque is applied to the output shafts 17, 21. In the second switching state, which is to say when the sun wheel 23 is coupled to the first planetary gear 24 via the planetary gear 26, the rotational sense is opposite to the coupling in the first switching state, so that the additional torque provided by the additional motor 16 will be distributed to the output shafts 17, 21. The individual transmission ratios in the drive device are selected in such a way that the distribution occurs uniformly within the context of the production-dependent tolerances.

Figure 3:
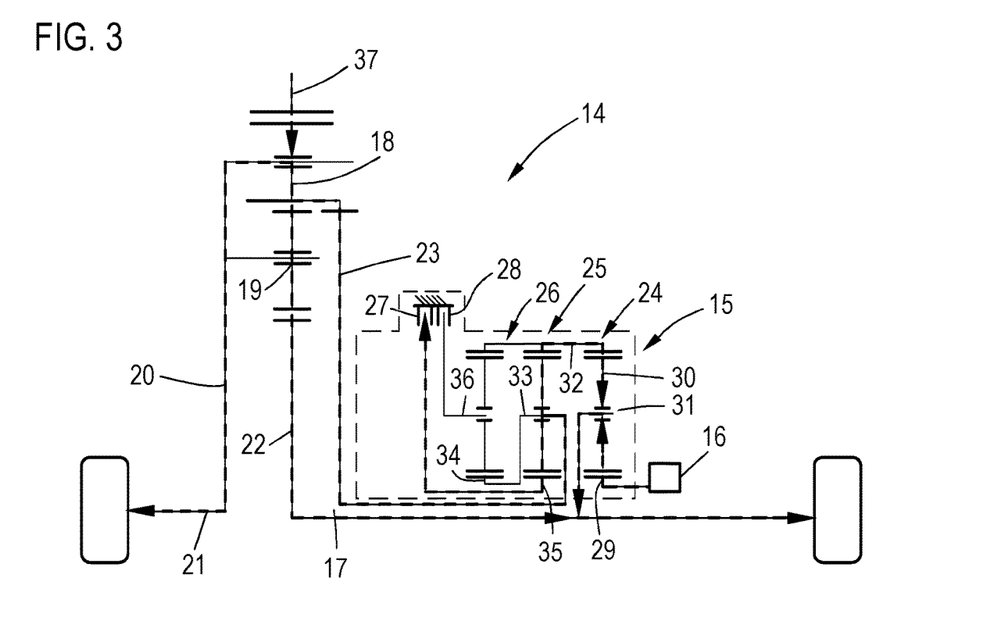
FIGS. 3, 4 and 5 show the transmission paths and direction of the torques in different operating states of the drive device shown in FIG. 2, and FIG. 6-8 show another embodiment of the drive devices according to the invention.

FIG. 3 indicates the torque coupling of the drive devices shown in FIG. 3 when the operation of the switching device is in the first switching stand. For example, it can be assumed that the torque distribution at a rear axle of the motor vehicle is shown during the driving operation with a left turn. When driving with a left turn, higher torques should be applied to the wheel that is outside the curve than to the wheel that is inside the curve. An additional torque of the additional motor should be therefore used in order to influence the distribution of a drive torque coupled via the ring wheel 37 of the differential to the output shafts 17, 21. The arrow sign indicates in each case a direction in which the coupling of the torque occurs.

The torque that is coupled by means of the differential to the ring wheel 27 is distributed to the output shafts 21, 17, as well as to the second sun wheel 23 on the planet carrier 33 of the second planetary gear 25. The continuation of the corresponding torque to the sun wheel 34 of the third planetary gear 28 is not indicated because the planetary carrier 36 of the third planetary 26 operates, as shown in FIG. 2, freely in the first switching stand and therefore no torque transmission will take place via the third planetary gear 26.

Since the sun wheel 35 of the second planetary gear 25 is braked, the torque is transmitted from the differential via the second sun wheel 23 through the common ring wheel 32 of the first planetary gears 24 and it is superimposed there by the torque provided from the additional motor 16. This results in an overall increased torque on the second drive shaft 17 that drives the right wheel of the vehicle.

If for example a torque of 1,500 Newtons is provided as the driving torque, the additional motor 16 can supply a torque of 110 Nm, in particular via an addition transmission ratio, not shown, and the torque development at the differential can occur in such a way that a torque of 151 Nm will be transmitted via the planetary carrier 19 through the differential to the left wheel, while 1,036 Nm will be transmitted via the first sun wheel 22 of the differential to the second output shaft 17, and an additional 313 Nm will be transmitted via the planetary carrier 31 to the second output shaft 17, whereby a torque of 1,349 Nm will be provided in total at the right wheel.

Thanks to the use of a torque reducing device, which is to say with the additional decoupling through the second sun wheel 23 of the differential, only a reduced torque of 313 Nm is supplied to the superimposition gear via the second sun wheel 23 in the described example. The first braking device 27 thus brakes a torque of 110 Nm.

Torque vectoring is thus possible with the illustrated drive arrangement already with a relatively small torque guided via the superimposition gear, wherein the components can be dimensioned so that they are particularly small and light.

Figure 4:
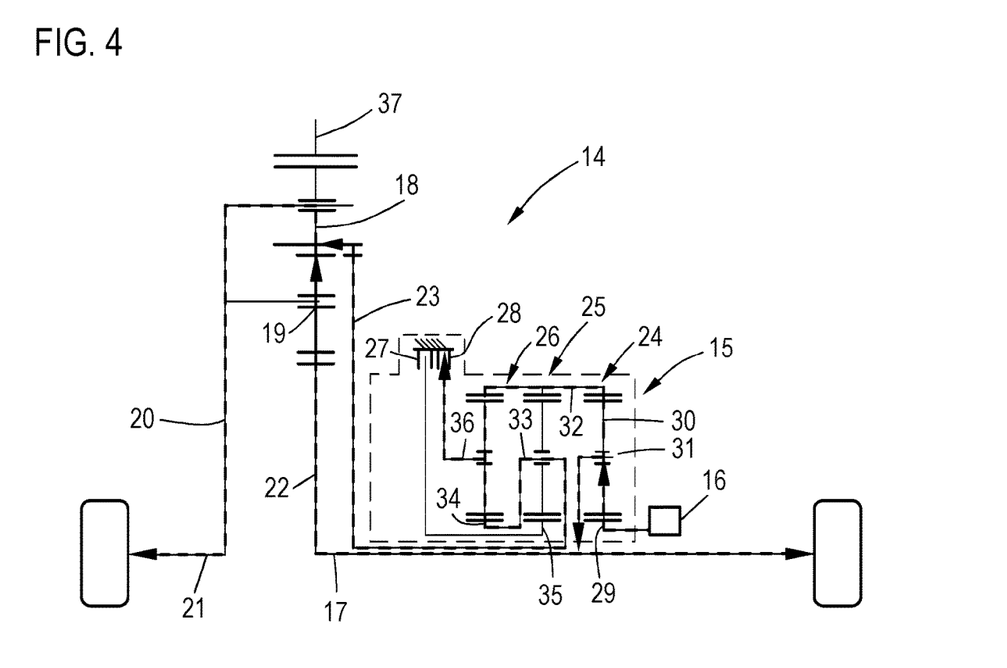

FIG. 4 shows the drive device according to FIG. 2, wherein the switching device is operated in the second switching state and wherein a control device, not shown, controls the additional motor 16 in such a way that the driving of at least the rear axle of the vehicle occurs exclusively through the additional motor 16. For this purpose, the ring wheel 37 can be decoupled via a coupling device, not shown, from a drive motor of the motor vehicle.

As was already described in connection with FIG. 2, the brake device 27 is not active in the second switching state and the brake device 28 is active. Therefore, no torque transmission occurs through the second planetary gear 25 and the torques provided via the second sun wheel 23 are transmitted from the sun gear 34 of the third planetary gear 29 to the common ring gear 26 and thus to the first planetary gear 24, since the planetary carrier of the third planetary gear 26 is blocked by the braking device 28.

A comparison with the FIG. 3 shows that the directions of the torque transfer are almost in all cases identical with the situation indicated in FIG. 3, wherein the direction of the torque transmission between the differential via the sun wheel 23 to or from both second or third planet gears 25, 26, however, is reversed in comparison to FIG. 3. This is because the torque transmission does not take place as shown in FIG. 3 from the planetary carrier 33 to the common ring wheel 32, but from the ring wheel 34 to the common ring wheel 32, wherein the rotational sense of the torque is reversed and a different transmission ratio is reached.

For example, a torque of 360 Nm can be provided from the additional motor 16, in particular via a transmission ratio. Due to the fact that a different torque coupling is present in the first switching state, a torque of 360 Nm is transmitted to the differential via the sun wheel 23 and a torque of 739 Nm is transmitted via the planetary carrier 31 to the output shaft 17. The torque supplied to the output shaft 17 is divided in such a way that 500 Nm can be transmitted via the wheel of the vehicle that is associated with the output shaft 17 to the road, and 239 Nm can be transmitted back to the differential via the first sun wheel 22. By superimposing the torque guided via the first sun wheel 22 from the output shaft 17 to the differential, and also the torque guided via the second sun wheel 23 to the differential, a torque of 500 Nm is provided via the common planetary carrier 20 also for the output shaft 21 and thus also for the left wheel of the motor vehicle. The second braking device must in the described example brake a torque of 739 Nm.

Figure 5:
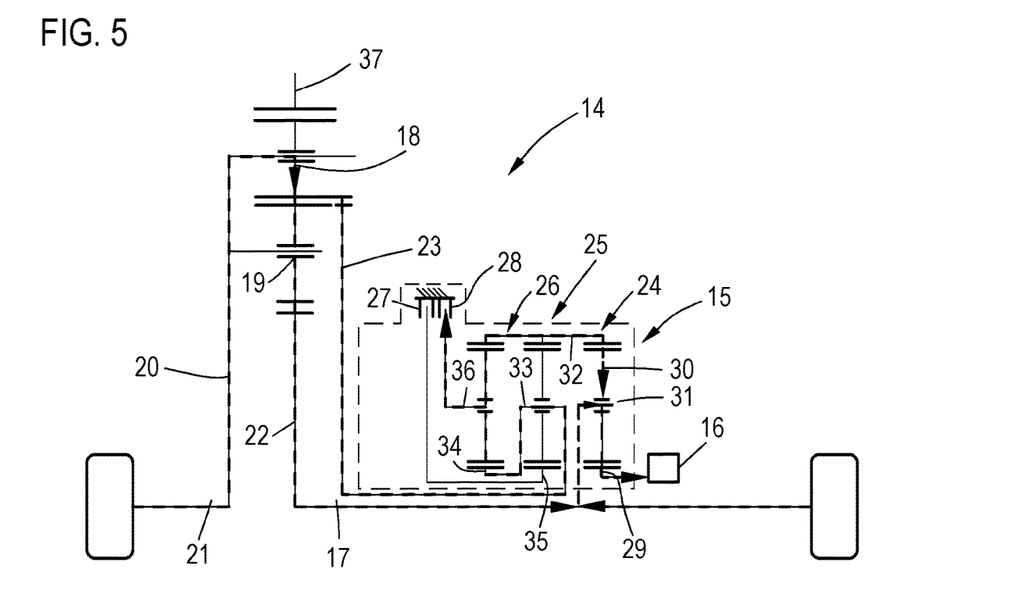

FIG. 5 shows the coupling of the torque with a recuperation drive, in which the switching device is operated in the second switching mode and the additional motor 16 is operated as a generator. For example, both wheels should be braked during a recuperation with a torque of 72 Nm. The torque of 72 Nm that is guided to the differential by the second output shaft 21 is distributed almost uniformly to the second output shaft 17 and via the second sun wheel 23 to the superposition gear 15.

The first planetary gear 24 superimposes a torque of 68.7 Nm, which was guided from the differential via the second sun wheel 23 and by the planetary gear 26 to the common ring gear 23, and a torque of 37.5 Nm that is input from the auxiliary motor 16 via the sun gear 29 for an overall torque of 106.4 Nm, which is guided via the planetary carrier 31 to the output wave 17. This torque is opposed to the torque supplied to the output shaft 17 via the first sun wheel 22, which is why the difference of 72 Nm between both torques is transmitted to the associated wheel from the output shaft 17. In the recuperation mode, the same torques are thus transmitted to both wheels. As a result of the use of the drive device 14 illustrated here, the absorbed kinetic energy can be supplied to the additional motor 16 for recuperation.

Figure 6:
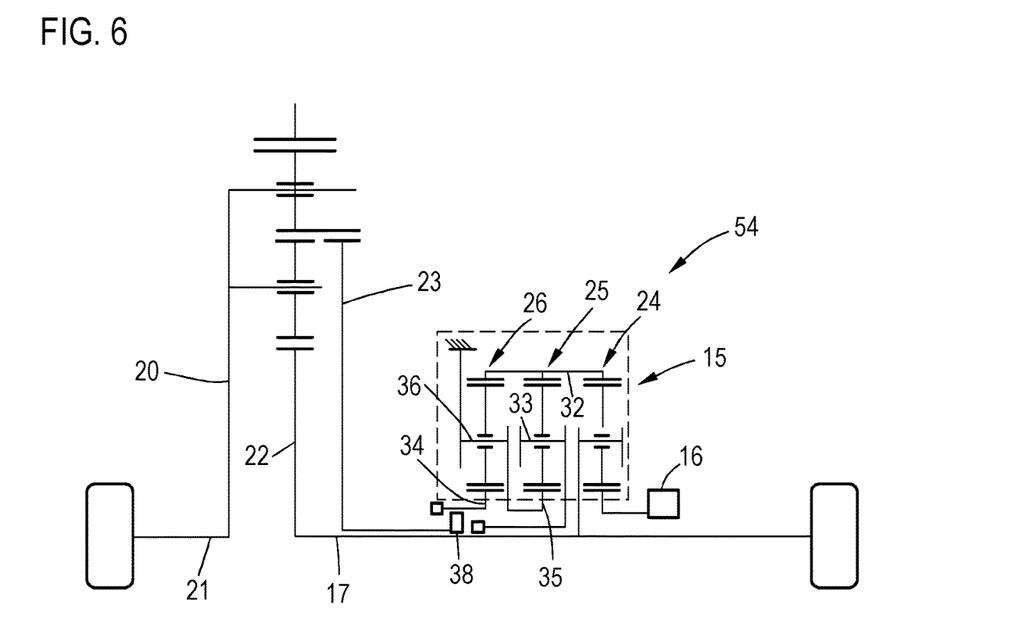

FIG. 6 shows another embodiment of a drive device 54, which functionally corresponds to the drive device 14 shown in FIG. 2. The construction of the differential for distributing torques to the output shafts 17, 21 and the branching of the supplied torques from the superposition gear 15 via the sun wheel 23 correspond to the drive device according to FIG. 2. The difference between the drive device 54 and the drive device 14 is that the guidance of these torques from the sun wheel 23 to the second or third planetary gear 25, 26, as well as the braking of the shafts of the planetary gears is solved differently. In the drive device 54, the planetary carrier 36 of the third planetary gear 26 and the sun wheel 35 of the of the planetary gear 25 is always fixed in a rotationally fixed manner, so that the second and the third planetary gears 25, 26 are respectively operated in the two-shaft operating mode. With the selection by means of which the planetary gears 25, 26, the torque tapped via the second sun wheel 23 is guided to the common ring wheel 32 takes place by means of a coupling device 38, so that the second sun wheel 23 of the differential is coupled in the first switching state with the planetary carrier 33 of the second planetary carrier 25, and in the second switching state with the sun wheel 34 of the third planetary gear 26. In this manner, a coupling of the torques is achieved in both switching states, which corresponds effectively to the respective coupling of the drive device 14 achieved according to FIG. 2.

Figure 7:
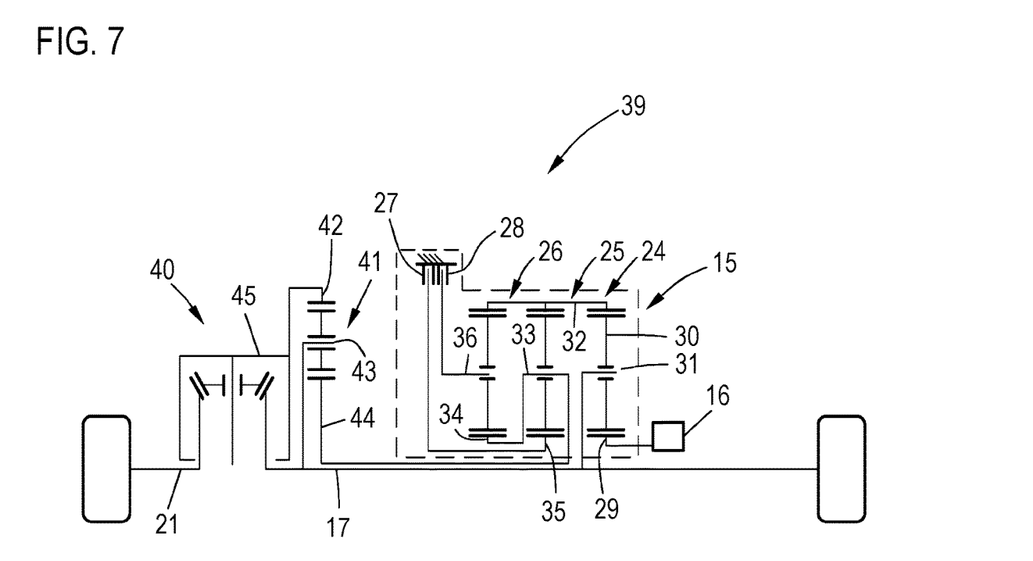

The drive device 39 according to FIG. 7 corresponds with respect to the construction of the superimposition transmission 15 to the drive device illustrated in FIG. 2. In contrast to this construction, however, a bevel gear differential 40 is used, by means of which the housing 45 can be coupled to a drive torque that is distributed to output shafts 17, 21. In order to reduce the torque transmitted to the superimposition gear 15 also when using the bevel wheel differential 40, the torque reducing transmission ratio device is provided with a further planetary gear 41. The torque guided to the superimposition gear 15 is tapped via a sun wheel 44. The planetary carrier 43 is rigidly coupled with the output shaft 17.

By utilizing a further planetary gear 41 as a torque reducing transmission device, it is also possible to achieve this kind of functionality even when a bevel gear is used, as was explained in the preceding figures.

Depending on the desired transmission ratio factors, it is also possible for the other planetary gear 41, which forms the transmission ratio device, to be connected differently to the bevel wheel differential 40, to the output shaft 17 and to the superimposition gear 15. In particular, the housing 45 of the bevel differential 45 can be also coupled rigidly to the planetary carrier 43 and the output shaft 17 can be coupled with the ring wheel. The same function will thus be achieved also with a different transmission ratio.

Figure 8:
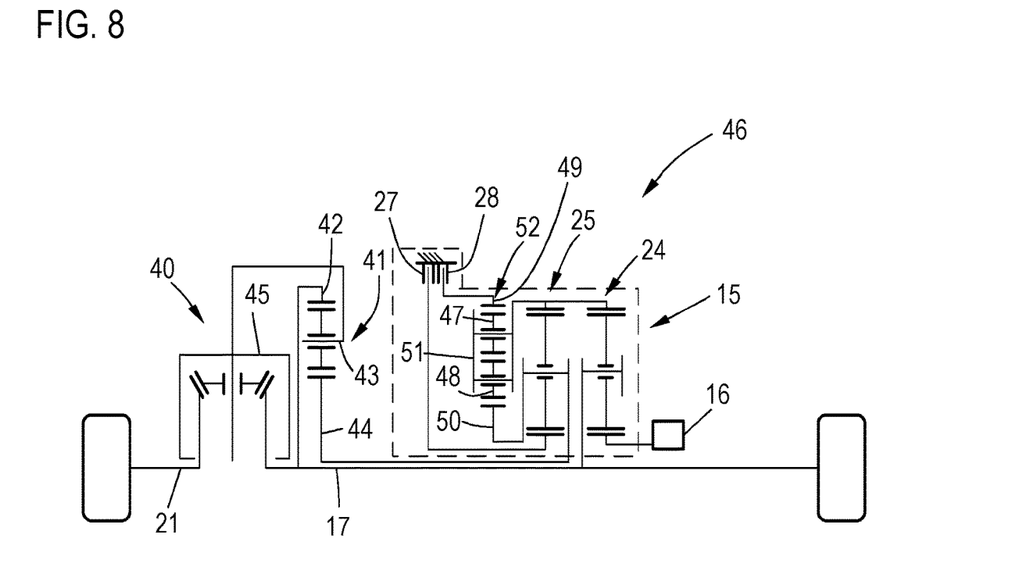

FIG. 8 shows another embodiment of a drive device 46, which is constructed largely in the same way as the drive device 39 shown in FIG. 7. The differences from the drive device 39 illustrated in FIG. 7 are that in the drive device 46 is used the alternative coupling of the planetary gear 41 to the bevel differential 40 that was already explained with reference to FIG. 7, as well as to the output drive 18, and that another configuration is used for the third planetary gear 52. The third planetary gear 52 is constructed as a planetary gear 52 in which the coupling is formed between the ring gear 49 and the sun wheel 5 via two sets of planetary wheels from which the planetary wheels 47, 48 are shown, and which are carried by a common planetary carrier 51.

In the embodiment shown here, the torque is supplied from the differential to the third planetary gear 52 via the sun wheel 50. The ring wheel 49 is designed in the planetary gear 52 separately from the ring wheel of the other planetary gears 24, 25 and it can be braked with the second braking device 28. A common ring wheel of the planetary gear 24, 25 is coupled with the planetary carrier 51 of the third planetary gear 52.

Essentially the same function is achieved with the drive device 46 as with the drive devices illustrated in the other figures, wherein a flexible adjustment of the transmission ratio is possible by using a third planetary gear 52 with several planetary wheel sets. In particular, a big difference is achieved between the transmission ratio between the first and the second switching state and between a boosting function and a recuperation function of the torque vectoring.

The invention claimed is:

1. A drive unit for a motor vehicle, comprising:
   a differential for distributing a drive torque that can be supplied via a drive shaft to two output shafts, and
   a superimposition gear coupled to the differential, one of the output shafts and an auxiliary motor for superimposing torque supplied from the output shaft, from the differential and from the auxiliary motor,
   wherein the differential is coupled via a torque reducing transmission ratio device to the superimposition gear,
   wherein the superimposition gear further comprises a switching device that can be controlled by a control device,
   wherein the superimposition gear superimposes in a first switching state of the switching device the torques supplied from the output shaft, from the differential and from the auxiliary motor in such a manner that the distribution of the torque to the output shafts depends on the additional torque generated by the auxiliary motor, and
   in a second switching state of the switching device the torques supplied from the output shaft, from the differential and from the auxiliary motor in such a manner that the additional torque is distributed uniformly to both output shafts.

2. The drive unit according to claim 1, wherein the superimposition gear comprises a superimposition device, which superimposes the torques supplied by the output shaft and the auxiliary motor with a torque derived from the torque supplied by the differential, wherein the derived torque is in the first switching state provided with a first rotational sense, and in the second switching state with a second rotational sense, which is opposite to the first rotational sense.

3. The drive unit according to claim 2, wherein the superposition gear comprises a first, a second and a third planetary gear, each having a ring wheel, a sun wheel, and at least one planetary wheel arranged at a planetary carrier, wherein the first planetary gear forms the superimposition device to which the derived torque is supplied in the first switching state via the second planetary gear, and in the second switching state via the third planetary gear.

4. The drive unit according to claim 3, wherein the ring wheels of the first, second and the third planetary gear are designed as a common ring wheel.

5. The drive unit according to claim 3, wherein that the switching device is designed to block in the first switching state the rotation of the ring wheel, the sun wheel or the planetary carrier of the second planetary gear, and to block in the second switching state the rotation of the ring wheel, the sun wheel or the planetary carrier of the third planetary gear.

6. The drive unit according to claim 5, wherein the switching device comprises a first braking device for braking the ring wheel, the sun wheel or the planetary carrier of the second planetary gear, and a second braking device for braking the ring wheel, the sun ring or the planetary carrier of the third planetary gear, wherein the first braking device is active in the first switching state, and the second braking device is active in the second switching state.

7. The drive unit according to claim 3, wherein the ring wheel, the sun wheel or the planetary carrier of the second planetary gear and the ring wheel, the sun wheel or the planetary carrier of the third planetary gear are permanently blocked, wherein the switching device comprises a coupling device, which supplies the torque supplied to the superimposition gear from the differential in the first switching state to the second planetary gear and in the second switching state to the third planetary gear.

8. The drive unit according to the claim 3, wherein a planetary gear with two planetary wheel sets is used as the first and/or the second planetary gear.

9. The drive unit according to claim 1, wherein the differential is designed as a double planetary gear with a first and a second planetary wheel set and a first and a second sun wheel, wherein ring wheel that can be driven by the drive torque is coupled via the first sun wheel and the first and the second planet wheel set and the second sun wheel as a torque reducing transmission ratio device with the superimposition gear.

10. The drive unit according to claim 1, wherein the differential is designed as a bevel wheel differential, wherein as a torque reducing transmission ratio device is used another planetary gear, which superimposes the torque supplied from a housing of the bevel wheel differential with a torque supplied from the output shafts to provide the torques supplied by the superimposition gear.

11. A method for operating a motor vehicle with a drive motor, comprising:
   a drive device for driving the wheels of at least one axle of the motor vehicle, wherein the drive device is coupled with a differential, by means of which a drive torque supplied via a drive shaft from the drive motor is distributed to two output shafts, and
   a superimposition gear coupled with the differential, an output axle and an auxiliary motor, by means of which the torques supplied from the output axle, the differential and the auxiliary motor are superimposed,
   wherein the differential is coupled via a torque reducing transmission ratio device with the superimposition gear, wherein it comprises a switching device, which is controlled by a control device,
   wherein torques supplied to the superimposition gear in a first switching state of the switching device from the output axle, the differential and the auxiliary motor are superimposed by the superimposition gear in such a way that the distribution of the drive torque to the output shafts depends on an additional torque generated by the auxiliary motor, and in a second switching state of the switching device, the torques supplied from the output axle, the differential and the auxiliary motor are superimposed by the superimposition gear in such a way that the additional torque is distributed uniformly to both output shafts.

12. Method according to claim 11, wherein in at least one operating mode of the control device, the control device is operated in the second switching state, wherein the auxiliary motor is controlled by the control device in order to provide a torque for driving the vehicle.

13. Method according to claim 11, wherein an electromotor is used as an auxiliary motor with an associated energy storage device, wherein in at least one operating mode of the control device, the switching device is operated in the second switching state, wherein the auxiliary motor is operated as a generator for charging an energy storage device.

* * * * *